(12) United States Patent  
Kohli

(10) Patent No.: US 8,145,948 B2
(45) Date of Patent: Mar. 27, 2012

(54) GOVERNANCE IN WORK FLOW SOFTWARE

(75) Inventor: Sandeep Kohli, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 12/609,558

(22) Filed: Oct. 30, 2009

(65) Prior Publication Data

US 2011/0107150 A1 May 5, 2011

(51) Int. Cl.
*G06F 11/00* (2006.01)
(52) U.S. Cl. ............. 714/26; 714/25; 714/57; 700/50; 706/52
(58) Field of Classification Search ............ 714/25, 714/26, 48, 57; 700/47, 48, 49, 50, 51; 706/1, 706/11, 15, 45, 52, 60, 922
See application file for complete search history.

(56) References Cited

U.S. PATENT DOCUMENTS

| | | | |
|---|---|---|---|
| 2003/0140117 A1* | 7/2003 | Kunz | 709/218 |
| 2005/0251570 A1 | 11/2005 | Heasman et al. | 707/224 |
| 2007/0156696 A1 | 7/2007 | Lim | 707/9 |
| 2007/0276883 A1* | 11/2007 | Kumar et al. | 707/204 |
| 2008/0148150 A1* | 6/2008 | Mall | 715/707 |
| 2009/0100371 A1* | 4/2009 | Hu | 715/780 |
| 2010/0100778 A1* | 4/2010 | Sullivan | 714/57 |

FOREIGN PATENT DOCUMENTS

EP 1814055 8/2007

OTHER PUBLICATIONS

Hajshirmohammadi, Ima; Using Fuzzy Set Theory to Objectively Evaluate Performance on minimally Invasive Surgical Simulators; 2006, Simon Fraser University Library, p. 81; http://ir.lib.sfu.ca/handle/1892/2666.*
NIDX—An Expert System for Real-Time Network Intrusion Detection; Authors: Bauer, David S. (Bell Communications Research Inc, Piscataway, NJ, USA); Koblentz, Michael E. Source: Proceedings—Computer Networking Symposium, 1988, p. 98-106 ISBN: 0-8186-0835-8 Conference: Proceedings—Computer Networking Symposium., Washington, DC, USA Sponsor: IEEE, Computer Soc, Technical Committee on Computer Communications, Los Alamitos, CA, USA Publisher: IEEE http://ieeexplore.ieee.org/articleSale/Sarticlejsp?arnumber=4983.

* cited by examiner

*Primary Examiner* — Robert Beausoliel, Jr.
*Assistant Examiner* — Joseph D Manoskey
(74) *Attorney, Agent, or Firm* — Holland & Knight LLP; Brian J. Colandreu, Esq.; V. Raman Bharatula, Esq.

(57) ABSTRACT

The disclosure presents categorization of users into groups comprising expert users and novice users. A system and method analyzes the users' inputted data in helpdesk troubleshooting software to determine the deviation of novice users from expert users, or the deviation of novice users to a preconfigured behavior as determined by management policy. Other embodiments are also disclosed.

18 Claims, 3 Drawing Sheets

Method to Analyze User Inputs

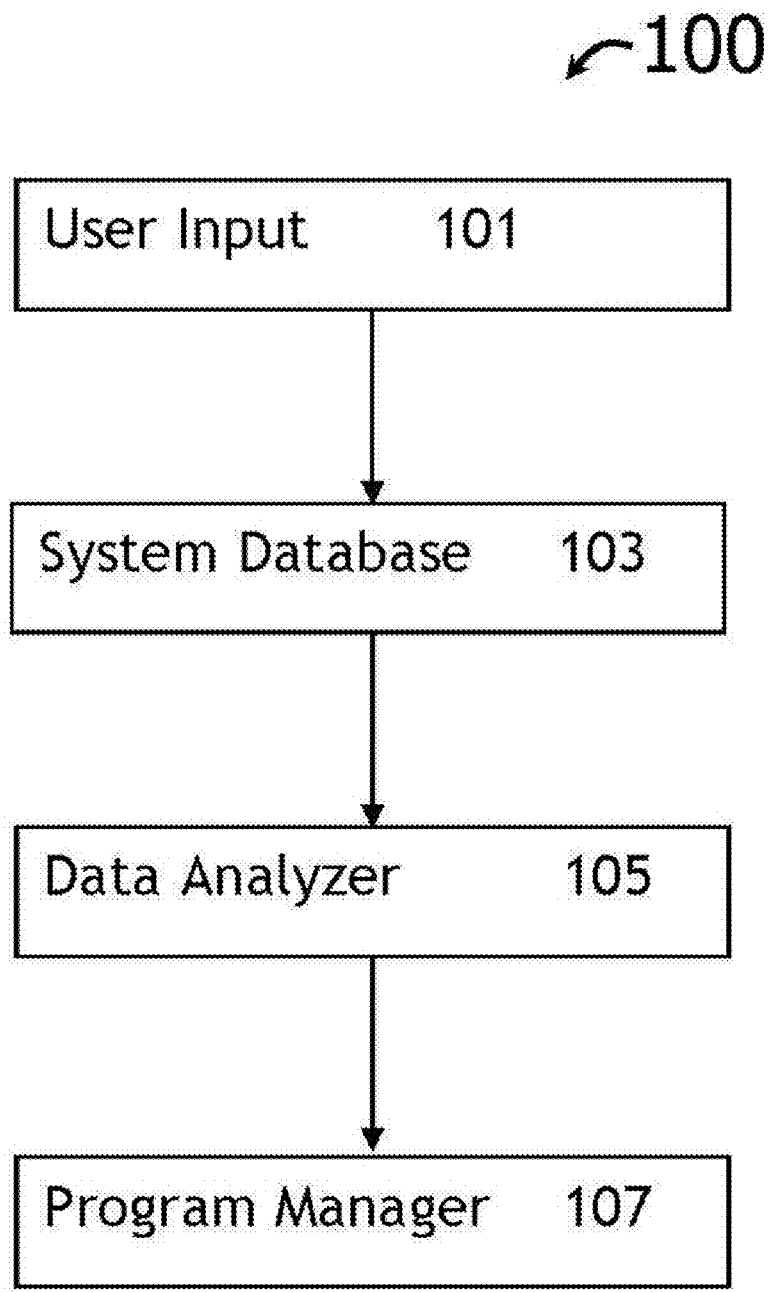
FIG. 1 – Architecture

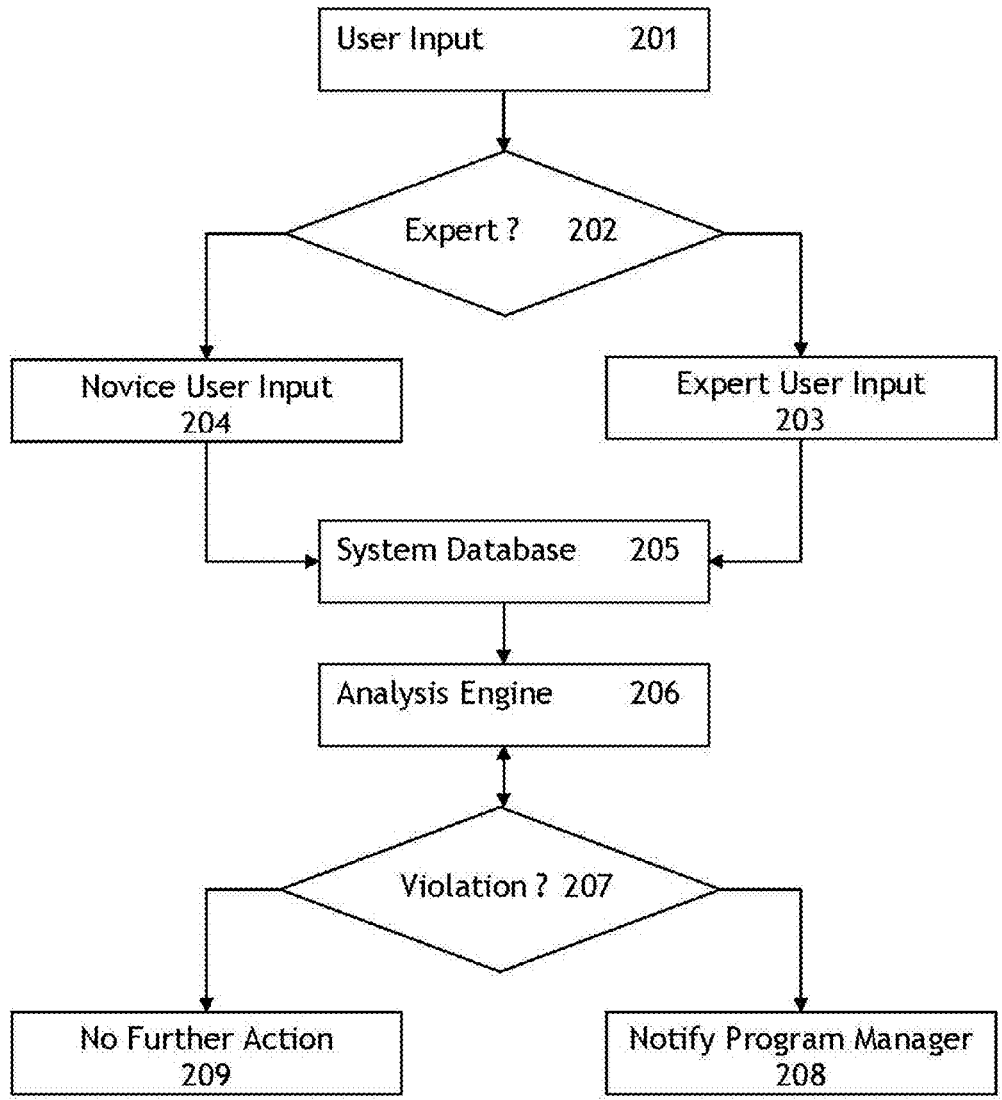
FIG. 2 – Method to Analyze User Inputs

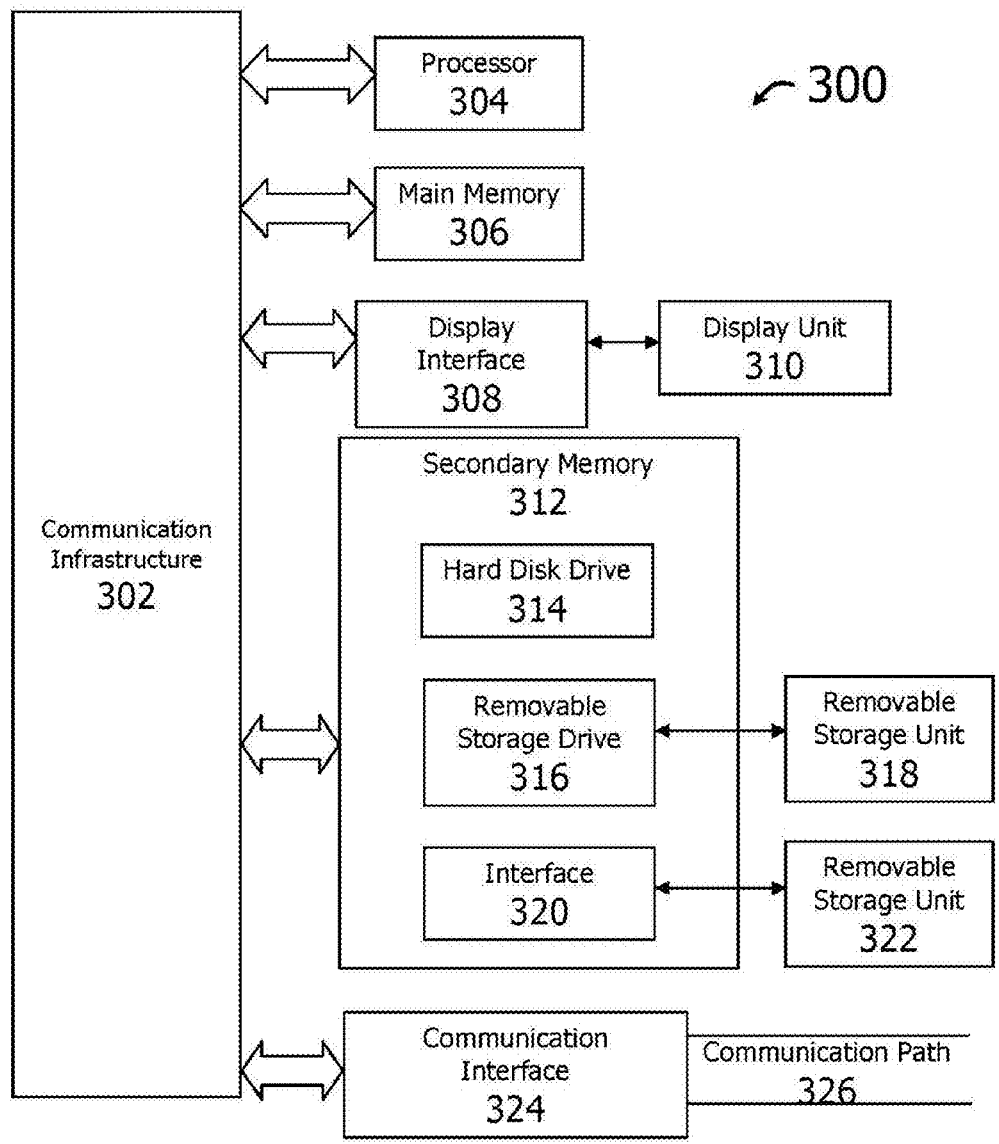
FIG. 3 – Data Processing System

GOVERNANCE IN WORK FLOW SOFTWARE

BACKGROUND

Tools which track users' activities and process and require a lot of discretionary input are prone to deliberate or accidental misuse by users. While many tools have input fields that, when filled out, can provide useful information to management, they are usually ignored by users and remain empty. For example, a tool from IBM® Rational® ClearQuest® provides a documentation field for the users' input, but depending on the kind of defect fix, these fields may or may not be set as mandatory fields (IBM, Rational, and ClearQuest are registered trademarks of IBM Corporation in the United States, other countries, or both). If not set as mandatory fields, they might not always be filled out by the users.

In addition, the tools may include estimation fields which are free flowing text. New users or new corners into the organization may not even be aware of the process and might never fill in these fields. Since the fields are optional, it is impossible to catch the violation until it is discovered by brute force methods or discovered accidentally after the damage has been done. For example, it may be difficult to catch a violation where a defect fix which required documentation never had any documentation because user never set the "documentation required" field to "mandatory." Analyzing the difference between the behaviors of the different users is also an issue with the current tools. Most tools are not smart enough to realize similar mistakes made by similar users.

SUMMARY

In an embodiment, a method for troubleshooting archiving software tools includes categorizing a plurality of users into an expert group and a novice group, assigning the novice users to the novice group via a first fuzzy logic membership function, and assigning expert users to the expert group via a second fuzzy logic membership function.

One or more of the following features may be included. Inputs for a plurality of optional fields may be received from the users during use of the troubleshooting archiving software tool. Information about status of the optional fields for the user may be stored.

The method may further include trouble shooting archiving software tool to indicate whether the optional fields are filled, partially filled or unfilled. First information may be analyzed to determine a first correlation function between the first information and the novice users may be analyzed, and the first information may be analyzed to determine a second correlation function between the first information and the expert users. A first statistical behavior of the novice users may be computed over a first preconfigured interval using the first analysis, and second statistical behavior of the expert users may be computed over a second preconfigured interval using the second analysis. Differences between the second statistical behavior to the first statistical behavior may be analyzed, and deviations within a first preconfigured margin may be detected using fuzzy logic. First deviation alerts may also be raised.

Alternatively, differences between the second statistical behavior to a predefined policy based behavior may be analyzed, deviations within a second preconfigured margin may be detected using fuzzy logic and raising second deviation alerts.

When receiving the first or second deviation alerts, corrective actions may be triggered. The corrective actions may include: providing feedback to the novice users; training the novice users; changing requirements for one or more of the optional fields from optional to mandatory; and advising the novice users to consider filling one or more of the optional fields when the novice users are providing the inputs to the troubleshooting archiving software. Most of the first and second analysis may be performed during idle time of the troubleshooting archiving software.

In another embodiment, a computer control logic for troubleshooting archiving software tools, when executed on a process, is capable of performing categorizing a plurality of users into an expert group and a novice group, assigning the novice users to the novice group via a first fuzzy logic membership function, and assigning expert users to the expert group via a second fuzzy logic membership function.

One or more of the following features may be included. Inputs for a plurality of optional fields may be received from the users during use of the troubleshooting archiving software tool. Information about status of the optional fields for the user may be stored.

The computer control logic may further be capable of performing trouble shooting archiving software tool to indicate whether the optional fields are filled, partially filled or unfilled. First information may be analyzed to determine a first correlation function between the first information and the novice users may be analyzed, and the first information may be analyzed to determine a second correlation function between the first information and the expert users. A first statistical behavior of the novice users may be computed over a first preconfigured interval using the first analysis, and second statistical behavior of the expert users may be computed over a second preconfigured interval using the second analysis. Differences between the second statistical behavior to the first statistical behavior may be analyzed, and deviations within a first preconfigured margin may be detected using fuzzy logic. First deviation alerts may also be raised.

Alternatively, differences between the second statistical behavior to a predefined policy based behavior may be analyzed, deviations within a second preconfigured margin may be detected using fuzzy logic and raising second deviation alerts.

When receiving the first or second deviation alerts, corrective actions may be triggered. The corrective actions may include: providing feedback to the novice users; training the novice users; changing requirements for one or more of the optional fields from optional to mandatory; and advising the novice users to consider filling one or more of the optional fields when the novice users are providing the inputs to the troubleshooting archiving software. Most of the first and second analysis may be performed during idle time of the troubleshooting archiving software.

In another embodiment, a data processing system comprising at least a processor and a memory for troubleshooting archiving software tools is capable of performing categorizing a plurality of users into an expert group and a novice group, assigning the novice users to the novice group via a first fuzzy logic membership function, and assigning expert users to the expert group via a second fuzzy logic membership function.

One or more of the following features may be included. Inputs for a plurality of optional fields may be received from the users during use of the troubleshooting archiving software tool. Information about status of the optional fields for the user may be stored.

The computer control logic may further be capable of performing trouble shooting archiving software tool to indicate whether the optional fields are filled, partially filled or unfilled. First information may be analyzed to determine a first correlation function between the first information and the novice users may be analyzed, and the first information may be analyzed to determine a second correlation function between the first information and the expert users. A first statistical behavior of the novice users may be computed over a first preconfigured interval using the first analysis, and second statistical behavior of the expert users may be computed over a second preconfigured interval using the second analysis. Differences between the second statistical behavior to the first statistical behavior may be analyzed, and deviations within a first preconfigured margin may be detected using fuzzy logic. First deviation alerts may also be raised.

Alternatively, differences between the second statistical behavior to a predefined policy based behavior may be analyzed, deviations within a second preconfigured margin may be detected using fuzzy logic and raising second deviation alerts.

When receiving the first or second deviation alerts, corrective actions may be triggered. The corrective actions may include: providing feedback to the novice users; training the novice users; changing requirements for one or more of the optional fields from optional to mandatory; and advising the novice users to consider filling one or more of the optional fields when the novice users are providing the inputs to the troubleshooting archiving software. Most of the first and second analysis may be performed during idle time of the troubleshooting archiving software.

Embodiments of the invention related to a method, system and computer program product to categorize users into groups comprising of expert and novice users may analyze the users' inputted data in a helpdesk troubleshooting archiving software tool to determine the deviation of novice users from expert users or the deviation of novice users to a preconfigured behavior as determined by management policy.

In a further embodiment, if the deviation is beyond a preconfigured threshold, a violation flag may be raised and the report is provided to upper management to take corrective action.

Yet a further embodiment of the invention may extract statistical behavior of each user as well as the statistical behavior of each user group, for example by using fuzzy logic.

In yet a further embodiment of the invention the method may enforce governance in the helpdesk troubleshooting archiving software tools.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

These and further aspects of exemplary embodiments the invention will become apparent from and will be elucidated hereinafter with respect with reference made to the accompanying drawings. The drawings illustrate only exemplary embodiments of the invention, and together with the description, serve to further explain the embodiments disclosed. The numerous advantages of the disclosure may be better understood by those skilled in the art by reference to the accompanying figures FIG. 1 is an exemplary embodiment of an architecture 100 of the invention;

FIG. 2 illustrates an exemplary embodiment of a method 200 to analyze user inputs; and FIG. 3 is an exemplary embodiment of a data processing system 300 on which the method of FIG. 2 and the architecture of FIG. 1 may be implemented.

DETAILED DESCRIPTION

Reference will now be made in detail to the subject matter disclosed, which is illustrated in the accompanying drawings.

Embodiments of the invention relate to categorizing users into expert users and novice users. An advantage of the embodiments of the invention disclosed herein is to improve the quality of input of novice users into the helpdesk troubleshooting archiving software tool. An example of embodiment is a method that helps novice users in a troubleshooting archiving software tool, for example a helpdesk troubleshooting archiving software tool, which comprises of categorizing a plurality of users into expert group and novice group.

A further embodiment of the invention keeps novice users within the parameters of tool usage by expert users to ultimately enforce any governance. The division of users to two categories automatically generates two or more user groups and provides the resources to analyze their input.

In yet a further embodiment analysis of the inputted data to determine the correlation of novice to expert users and to extract the statistical behavior of each user as well as the statistical behavior of each user group using a fuzzy logic algorithm is done.

In yet a further embodiment of the invention is disclosed a method in which a tool can be made intelligent, by building intelligence into the tool, to determine problem areas in its usage. Most software configures the way they function according to the skill of users. However, embodiment of the invention teaches configuring guidance for one set of users based on the use by other set(s) of users.

In yet a further embodiment of the invention, the method determines the deviation of novice users from expert users or the deviation of novice users to a preconfigured behavior as determined by management policy. In one embodiment, if such deviation is beyond a preconfigured threshold, a violation flag is raised and the report is provided to the management for corrective action.

Yet a further embodiment of the invention observes the behavior of expert users and compares such behavior against that of novice users and computers the deviations. For example, for optional fields it is likely that most of the time they are left blank by novice users while it is mostly unlikely that the expert users leave such fields blank.

Exemplary embodiments of the invention are illustrated in FIG. 1 as an architecture 100 and FIG. 2 as a method 200, as described below. Depending on the expertise 202 of users, the user input 101, 201 is divided into two categories: the expert user input 203 and the novice user input (204.) The embodiment enforces governance in the tools by not changing the tools interface for different kinds of users, but learning from the users themselves.

Furthermore, in an exemplary embodiment, these user categories' input is stored, for example, in the System Database 103, 205. Each field of the helpdesk software is categorized to be filled, unfilled, or partially-filled, by each user.

In yet a further embodiment, an analysis engine 105, 206, for example fuzzy logic based engine or neural network based engine or a Bayesian belief based network etc., is plugged into the helpdesk troubleshooting archiving software tool to do the analysis to determine the correlation to novice and expert users and to extract the statistical behavior of each user. It should be apparent to one skilled in the art that various other kinds of analysis engines and different methods of comparing data can be used in an embodiment of the invention.

Yet a further embodiment of the invention applies to workflow and/or tracking tools where for example a large number of fields are optional and there is no objective or concrete way to determine or figure out whether the input is correct.

In yet a further embodiment, if the deviation is beyond a preconfigured threshold, the violation flag 207 is set and as a result the program manager 107 is notified 208. This way the program manager 107 can review the novice users' input to determine if they are following or not following the process correctly. Therefore, the problems are discovered pro-actively by the tool, rather than much later in the cycle.

If the deviation is within the preconfigured threshold, no further action (209) is taken. For example, an embodiment absorbs the policies and processes of a parent site and internally compares the patterns of usage at a new development site and pro-actively gives advice to the users.

In one embodiment, these rules and policies are run in batch mode, for example at idle times, with minimum user intervention.

Yet a further embodiment of the invention records previous history of behavior of all users and the status of the fields when they have provided input in their reports, which comprises of filled, partially filled, or unfilled. Then, an analysis engine is used to derive correlation between the novice and expert users. The records of previous history of behavior can be classified and stored in a repository.

In a further embodiment, follows up with statistical analysis of the saved information is done to determine the probability of each field being filled, partially filled or optionally filled for different categories of service calls. All such information is then analyzed using a methodology such as a fuzzy logic, neural networks, Bayesian networks etc., to flag deviation between novice users and expert users and to suggest corrective actions.

One embodiment of the invention assigns the novice users to the novice group and expert users to the expert group via for example a fuzzy logic membership function. An embodiment of the invention receives different input for optional fields from different users during the use of the helpdesk troubleshooting archiving software tool. The embodiment sorts information about status of optional fields for helpdesk troubleshooting archiving software tool to indicate whether optional fields are filled, partially filled, or unfilled. This is done by analyzing the information to determine a correlation function between information inputted by novice users verses the expert users.

An example of the method is calculating statistical behavior of novice or expert users over a preconfigured interval using analysis; and analyzing differences between the statistical behaviors and detecting deviations within a preconfigured margin using for example fuzzy logic etc., and raising deviation alerts which will result in triggering corrective actions when receiving the deviation alerts.

In one embodiment, the corrective actions comprises: providing feedback to the novice users, training the novice users, changing requirements for one or more of the optional fields from optional to mandatory, and advising the novice users to consider filling one or more of the optional fields when the novice users are providing inputs to the helpdesk troubleshooting archiving software. In an embodiment, most of the analysis is performed during idle time of helpdesk troubleshooting archiving software.

A system, an apparatus, a device, or an article of manufacture comprising one of the following items is an exemplary embodiment of the invention: helpdesk troubleshooting archiving software tool, expert group, novice group, logic membership function, optional fields, correlation function, preconfigured interval, statistical behavior, deviations, preconfigured margin, deviation alerts, mandatory field, or idle time, applying the method mentioned above, for the purpose of the current invention or governance in work flow software.

FIG. 3 illustrates a block diagram of an exemplary data processing system 300, for example a computing system such as a desktop computer, laptop computer, PDA, mobile phone and the likes, that can be used for implementing exemplary embodiments of the present invention. Data processing system 300 includes one or more processors, for example processor 304 as illustrated in FIG. 3. Processor 304 is coupled to a communication infrastructure 302 (for example, a communications bus, cross-over bar, or network). Various software embodiments are described in terms of this exemplary data processing system. After reading this description, it will become apparent to a person of ordinary skill in the relevant art(s) how to implement the invention using other data processing systems and/or computer architectures.

Exemplary data processing system 300 can include display interface 308 that forwards graphics, text, and other data from the communication infrastructure 302 (or from a frame buffer not shown) for display on display unit 310. Data processing system 300 also includes main memory 306, which can be random access memory (RAM), and may also include secondary memory 312. Secondary memory 312 may include, for example, hard disk drive 314 and/or removable storage drive 316, representing a floppy disk drive, a magnetic tape drive, an optical disk drive, etc. Removable storage drive 316 reads from and/or writes to removable storage unit 318 in a manner well known to those having ordinary skill in the art. Removable storage unit 318, represents, for example, a floppy disk, magnetic tape, optical disk, etc. which is read by and written to by removable storage drive 316. As will be appreciated, removable storage unit 318 includes a computer usable storage medium having stored therein computer software and/or data.

In exemplary embodiments, secondary memory 312 may include other similar means for allowing computer programs or other instructions to be loaded into the computer system. Such means may include, for example, removable storage unit 322 and interface 320. Examples of such may include a program cartridge and cartridge interface, such as that found in video game devices, a removable memory chip, such as an EPROM, or PROM and associated socket, and other removable storage units 322 and interfaces 320 which allow software and data to be transferred from removable storage unit 322 to data processing system 300.

Data processing system 300 may also include a communications interface 324. Communications interface 324 allows software and data to be transferred between the data processing system and any other external devices. Examples of communications interface 324 may include a modem, a network interface, such as an Ethernet card, a communications port, a PCMCIA slot and card, etc. Software and data transferred via communications interface 324 are typically in the form of signals which may be, for example, electronic, electromagnetic, optical, or other signals capable of being received by communications interface 324. These signals are provided to communications interface 324 via communications path (that is, channel) 326. Channel 326 carries signals and may be implemented using wire or cable, fiber optics, a phone line, a cellular phone link, an RF link, and/or other communications channels.

The terms "computer program medium," "computer usable medium," and "computer readable medium" are used to generally refer to media such as main memory 306 and secondary memory 312, removable storage drive 316, a hard disk installed in hard disk drive 314, and signals thereof. Computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, which allows a computer to read such computer readable information.

Computer programs, also called computer control logic, are typically stored in main memory 306 and/or secondary memory 312. Computer programs may also be received via communications interface 324. Such computer programs, when executed, can enable the computer system to perform the features of exemplary embodiments of the invention as discussed herein. In particular, computer programs, when executed, enable processor 304 to perform the features of data processing system 300. Accordingly, such computer programs represent controllers of the data processing system.

Embodiments of the invention disclosed methods that may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

When a single element or article is described herein, it will be apparent that more than one element/article (whether or not they cooperate) may be used in place of a single element/article. Similarly, where more than one element or article is described herein (whether or not they cooperate), it will be apparent that a single element/article may be used in place of the more than one element or article. The functionality and/or the features of an element may be alternatively embodied by one or more other elements which are not explicitly described as having such functionality/features. Thus, other embodiments need not include the element itself.

Although embodiments of the invention have been described with reference to the embodiments described above, it will be evident that other embodiments may be alternatively used to achieve the same object. The scope is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. Embodiments of the invention can be implemented by means of hardware comprising several distinct elements.

What is claimed is:

1. A method for troubleshooting archiving software tools, the method comprising:
   categorizing a plurality of users into an expert group and a novice group;
   assigning the novice users to the novice group via a first fuzzy logic membership function;
   assigning expert users to the expert group via a second fuzzy logic membership function;
   receiving inputs for a plurality of optional fields from the plurality of users during use of the troubleshooting archiving software tool;
   storing first information about status of the optional fields for the user;
   performing a first analysis of the first information to determine a first correlation function between the first information and the novice users;
   performing a second analysis of the first information to determine a second correlation function between the first information and the expert users;
   computing first statistical behavior of the novice users over a first preconfigured interval using the first analysis; and
   computing second statistical behavior of the expert users over a second preconfigured interval using the second analysis.

2. The method as claimed in claim 1, further comprising:
   trouble shooting archiving software tool to indicate whether the optional fields are filled, partially filled or unfilled.

3. The method as claimed in claim 1, further comprising:
   analyzing differences between the second statistical behavior to the first statistical behavior and detecting deviations within a first preconfigured margin using fuzzy logic and raising first deviation alerts.

4. The method as claimed in claim 3, further comprising:
   alternatively analyzing differences between the second statistical behavior to a predefined policy based behavior and detecting deviations within a second preconfigured margin using fuzzy logic and raising second deviation alerts.

5. The method as claimed in claim 4, further comprising:
   triggering corrective actions when receiving the first or second deviation alerts.

6. The method as claimed in claim 5, wherein the corrective actions comprise;
   providing feedback to the novice users;
   training the novice users;
   changing requirements for one or more of the optional fields from optional to mandatory; and advising the novice users to consider filling one or more of the optional fields when the novice users are providing the inputs to the troubleshooting archiving software, and wherein at least part of the first and second analysis is performed during idle time of the troubleshooting archiving software.

7. A computer program product residing on a non-transitory computer readable medium having a plurality of instructions stored thereon, which, when executed by a processor, cause the processor to perform orations comprising:
  categorizing a plurality of users into an expert group and a novice group;
  assigning the novice users to the novice group via a first fuzzy logic membership function;
  assigning expert users to the expert group via a second fuzzy logic membership function;
  receiving inputs for a plurality of optional fields from the plurality of users during use of the troubleshooting archiving software tool;
  storing first information about status of the optional fields for the user;
  performing a first analysis of the first information to determine a first correlation function between the first information and the novice users;
  performing a second analysis of the first information to determine a second correlation function between the first information and the expert users;
  computing first statistical behavior of the novice users over a first preconfigured interval using the first analysis; and
  computing second statistical behavior of the expert users over a second preconfigured interval using the second analysis.

8. The computer program product as claimed in claim 7, wherein the operations further comprise:
  trouble shooting archiving software tool to indicate whether the optional fields are filled, partially filled or unfilled.

9. The computer program product as claimed in claim 7, wherein the operations further comprise:
  analyzing differences between the second statistical behavior to the first statistical behavior and detecting deviations within a first preconfigured margin using fuzzy logic and raising first deviation alerts.

10. The computer program product as claimed in claim 9, wherein the operations further comprise:
  alternatively analyzing differences between the second statistical behavior to a predefined policy based behavior and detecting deviations within a second preconfigured margin using fuzzy logic and raising second deviation alerts.

11. The computer program product as claimed in claim 10, wherein the operations further comprise:
  triggering corrective actions when receiving the first or second deviation alerts.

12. The computer program product as claimed in claim 11, wherein the corrective actions comprise:
  providing feedback to the novice users;
  training the novice users;
  changing requirements for one or more of the optional fields from optional to mandatory; and
  advising the novice users to consider filling one or more of the optional fields when the novice users are providing the inputs to the troubleshooting archiving software, and wherein at least part of the first and second analysis is performed during idle time of the troubleshooting archiving software.

13. A data processing system comprising at least a processor and a memory for troubleshooting archiving software tools, the data processing system capable of performing:
  categorizing a plurality of users into an expert group and a novice group;
  assigning the novice users to the novice group via a first fuzzy logic membership function;
  assigning expert users to the expert group via a second fuzzy logic membership function;
  receiving inputs for a plurality of optional fields from the plurality of users during use of the troubleshooting archiving software tool;
  storing first information about status of the optional fields for the user;
  performing a first analysis of the first information to determine a first correlation function between the first information and the novice users;
  performing a second analysis of the first information to determine a second correlation function between the first information and the expert users;
  computing first statistical behavior of the novice users over a first preconfigured interval using the first analysis; and
  computing second statistical behavior of the expert users over a second preconfigured interval using the second analysis.

14. The data processing system as claimed in claim 13, further capable of performing:
  trouble shooting archiving software tool to indicate whether the optional fields are filled, partially filled or unfilled.

15. The data processing system as claimed in claim 13, further capable of performing:
  analyzing differences between the second statistical behavior to the first statistical behavior and detecting deviations within a first preconfigured margin using fuzzy logic and raising first deviation alerts.

16. The data processing system as claimed in claim 15, further capable of performing:
  alternatively analyzing differences between the second statistical behavior to a predefined policy based behavior and detecting deviations within a second preconfigured margin using fuzzy logic and raising second deviation alerts.

17. The data processing system as claimed in claim 16, further capable of performing:
  triggering corrective actions when receiving the first or second deviation alerts.

18. The data processing system as claimed in claim 17, wherein the corrective actions comprise:
  providing feedback to the novice users;
  training the novice users;
  changing requirements for one or more of the optional fields from optional to mandatory; and
  advising the novice users to consider filling one or more of the optional fields when the novice users are providing the inputs to the troubleshooting archiving software, and wherein at least part of the first and second analysis is performed during idle time of the troubleshooting archiving software.

* * * * *